July 1, 1969 J. R. COUPER 3,452,368
PORTABLE WASTE DISPOSER
Filed Oct. 7, 1966 Sheet 2 of 3

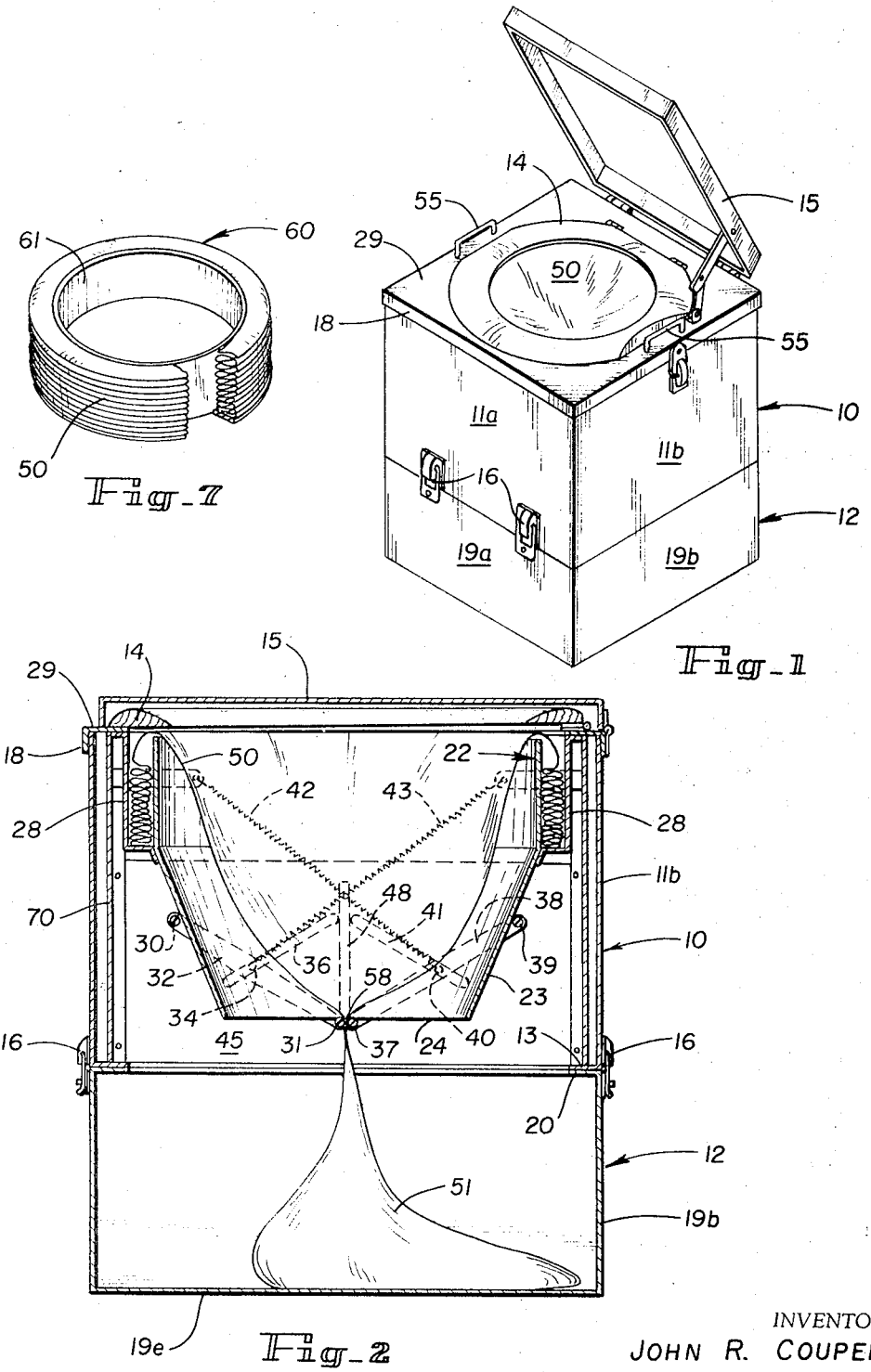

INVENTOR.
JOHN R. COUPER
BY
Richard D. Law
ATTORNEY

July 1, 1969  J. R. COUPER  3,452,368
PORTABLE WASTE DISPOSER
Filed Oct. 7, 1966  Sheet 3 of 3
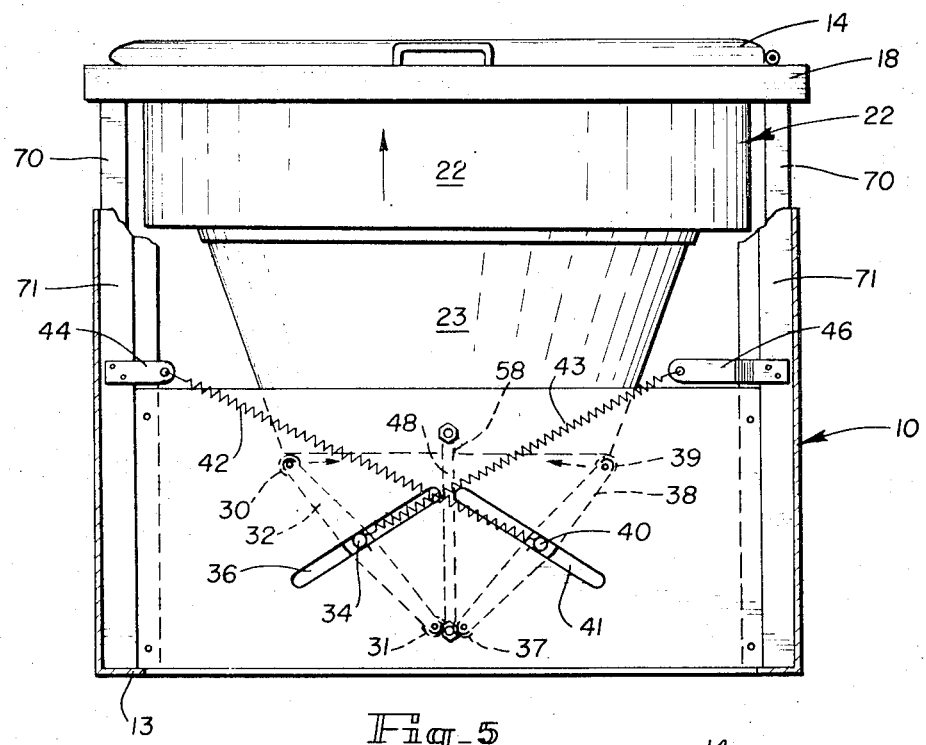
Fig_5
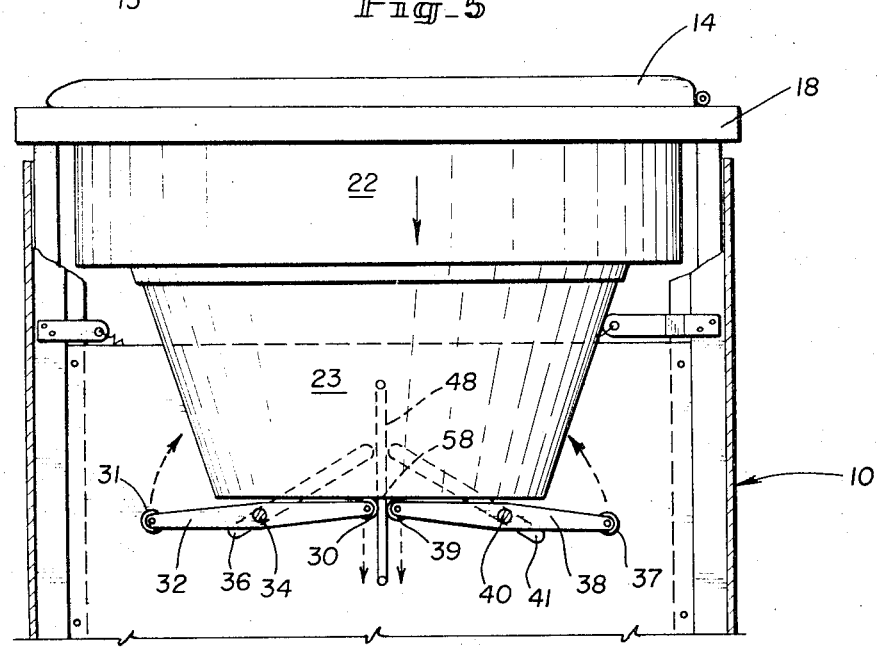
Fig_6
INVENTOR.
JOHN R. COUPER
BY Richard D. Law
ATTORNEY United States Patent Office 3,452,368
Patented July 1, 1969

3,452,368
PORTABLE WASTE DISPOSER
John R. Couper, Denver, Colo., assignor, by mesne assignments, to FTS Corporation, Denver, Colo. a corporation of California
Filed Oct. 7, 1966, Ser. No. 585,093
Int. Cl. A47k 11/02
U.S. Cl. 4—142                          9 Claims

ABSTRACT OF THE DISCLOSURE

A portable waste disposer having a length of tubular, plastic material extending from an outer annular area through a central opening, includes a conical bowl with a central opening through which the tubular material passes and means for collapsing and sealing said tubular material and progressively pulling increments of the tubular material through said central opening removing waste and providing clean tubular material in the bowl, maintaining a seal on said tubular material at all times.

---

This invention relates to waste disposers, and more particularly to portable waste disposers arranged for receiving multiple batches of waste, progressively receiving the same through a lock mechanism, and for retaining such multiple batches of waste sealed in a container for subsequent discarding.

Portable disposers, and particularly portable toilets, have been known and used previously. Some such disposers include a folding frame which is arranged to hold an open-topped plastic bag below a toilet seat. After each use, the bag is removed from the frame, its open end tied shut, and the bag discarded. At best, the frames were not too steady and were readily tipped over on being bumped or by the movement of a vehicle, with disastrous results when filled or partially filled with liquid. The instability of the frame and the open bag has prevented extensive use of such a waste disposer for moving vehicles, such as campers, trailers and the like. Additionally, once used, the open bag has no means to prevent escape of noxious odors except by removing and discarding the bag.

The present invention provides a portable waste disposer and toilet which is arranged to accept batches of waste and progressively "flush" the same into an elongated plastic tube, while maintaining previous waste sealed from the atmosphere at all times. The disposer provides means for maintaining the waste in a sealed and spillproof container during transportation and/or movement of the disposer. Waste is progressively discharged into an elongated container of plastic tubing having one end sealed. The seal means includes means for advancing short sections of the tubing as waste is progressively disposed into the disposer and the disposer is "flushed." The seal means seals the tubing, making it air and liquid-tight while within the dispenser. The seal means is arranged to be actuated to maintain the tubing closed and progressively seal off short lengths of tubing and to feed additional lengths of tubing into the seal means. Thus, additional waste may be added to the disposer while maintaining it spillproof and odorproof. In one form, the tubing is prepared in a cartridge, and the length of tubing is sufficient to be advanced for a predetermined number of flushes in progressively disposing of batches of waste, and the filled tubing is easily discarded. When made in one particular size and configuration, the disposer is a useful portable toilet with a length of plastic tubing sufficient for from between five and ten flushings.

Included among the objects and advantages of the present invention is a portable waste disposer which is arranged to be used for progressive batches of waste, and the previously accepted waste is sealed in an elongated plastic tube which, while contained in the disposer, is spillproof and odorless.

Another object of the invention is to provide a portable disposer which utilizes an elongated length of plastic tubing into which batches of waste may be progressively added and the whole tubing discarded with the enclosed waste.

Another object of the invention is to provide a portable disposer which includes seal means which maintains a length of plastic tubing temporarily sealed at predetermined intervals along its length as increments of the tubing are passed through the seal means.

A still further object of the invention is to provide a portable toilet which utilizes an elongated plastic bag which is continuously sealed as increments of the bag are passed through the toilet and waste may be progressively added to the tube by a simple "flushing" action, so that the entire tube and waste content may be discarded at one time.

These and other objects and advantages of the invention may be readily ascertained by referring to the following description and appended drawings in which:

FIG. 1 is a perspective view of a disposer according to the invention;

FIG. 2 is a side elevational view of a disposer according to the invention in cross-section, illustrating the positioning of en elongated plastic tubing and the seal means therefor;

FIG. 5 is a generally schematic, partial cross-sectional view, illustrating one position during a "flushing" action of the valve and seal means of the disposer of the invention;

FIG. 6 is another generally schematic, cross-sectional view, illustrating another position during "flushing" action of the valve and seal means according to the invention; and FIG. 7 is a perspective view, partially cut away, of a cartridge containing a length of plastic tubing fan-folded for use in a disposer according to the invention.

Figure 3:
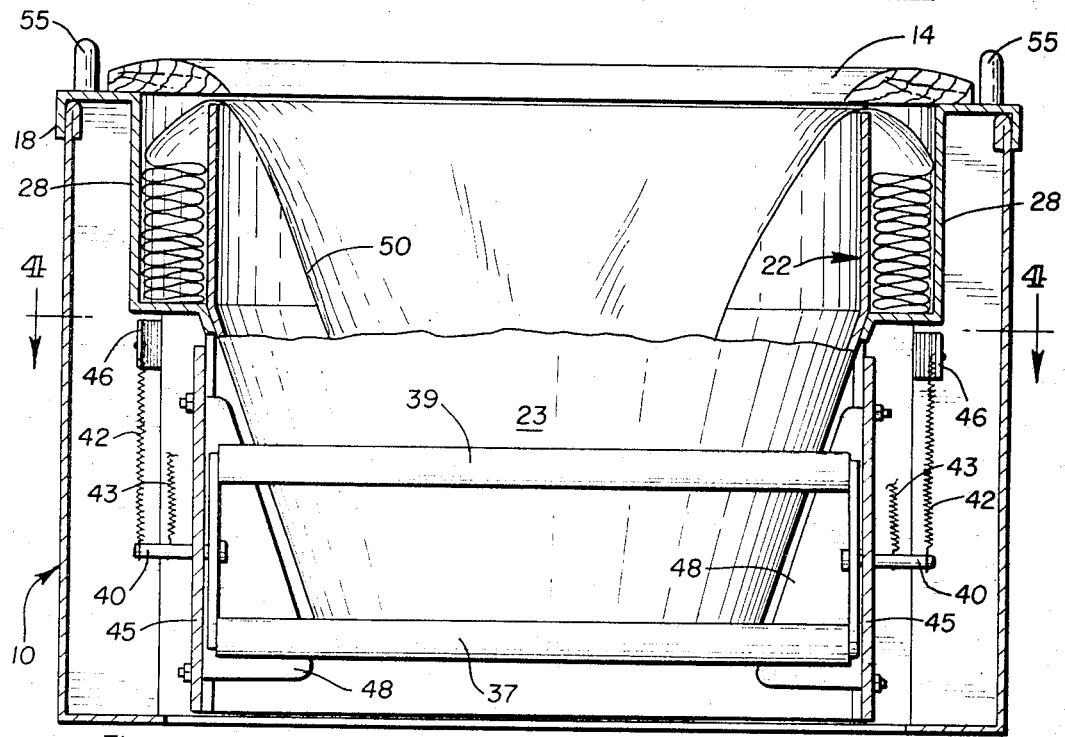
FIG. 3 is a cross-sectional view of the disposer of FIG. 2, taken at right angles thereto.
Figure 4:
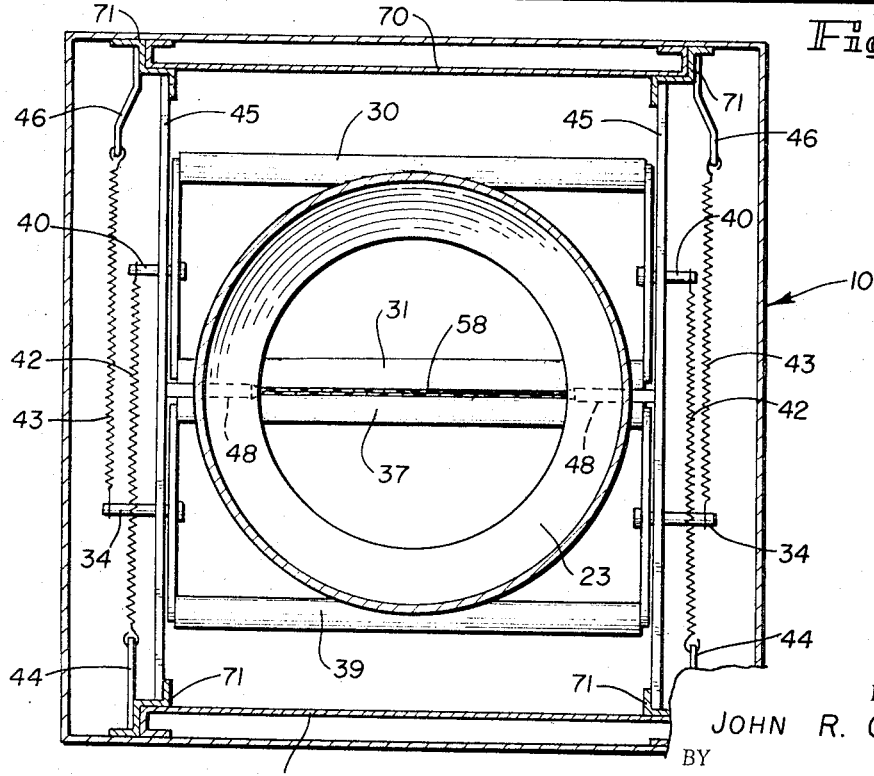
FIG. 4 is a cross-sectional view of the disposer of FIG. 3, taken along section line 4—4.

In the modification selected for illustration, the disposer is a hollow container mounted on an open-topped base. When used as a toilet the container should be of a suitable height for the user, and it is contemplated that portions of the disposer may be collapsible, such as the top telescoping into the base when not in use. Where size of the unit is of no particular problem, the base may be affixed to the top so that it may be removed, but need not telescope over the top to collapse into the smaller unit. In some applications, particularly for trailers, small boats and the like, the collapsible unit may be the unit of choice.

As illustrated, the portable disposer includes an upper portion, shown generally by number 10, and a lower portion, shown generally by number 12. The upper portion includes, when used as a toilet, a stool seat 14 and a cover 15. When used as a garbage disposer the seat may not be needed. In one form, the top is made to telescope into the bottom 12 and latches 16 are provided on at least two sides for securing the two parts together in extended position so that the top is maintained at the desired height above the bottom 12. The latches may be released and the top telescopes into the bottom to provide a compact unit. In other models the top is the same size as the bottom and the latches provide means for securing the removable bottom to the top.

The top member 10 is a hollow container including upright side walls 11a, 11b, etc. intersecting each other at right angles. A pair of spaced-apart short side walls 45 are secured in the top 10. A top wall 29 with overhanging lips 18 removably seat on the side walls of the top member 10 and to which is attached the seat 14 and the top or cover 15. The base 12 includes upright side walls 19a, 19b, etc., having inwardly directed flanges 20 at their tops, and a bottom 19e which closes the bottom. The base 12 has an open top onto which the upper portion 10 seats by inwardly directed flanges 13 on the bottoms of the side walls. As shown in FIG. 2, means 20 may be provided for supporting the upper section 10. Where the top telescopes into the bottom 12, the flange means 20 is not required, but latch means are required for supporting the top on the base 12 in addition to the weight of a person sitting on the unit.

Attached to the top 29 is a circular member 22 which has a conical section 23 provided with a lower opening 24. The circular member fits between the two short side walls 45. An outer circular member 28 is connected to the inner member 22, providing an annular recess therebetween which is exposed when the seat 14 is raised.

The mechanism which forms the seal and valve for the plastic tube which passes through the device includes two sets of opposed rollers, each set of which is biased against each other under spring tension and they are so arranged that two rollers are biased against each other at all times. The rollers are mounted on the ends of centrally pivoted arms. As shown in FIG. 2, rollers 30 and 31 are mounted between a pair of arms 32, pivoted on pivot pins 34. The rollers are mounted adjacent the ends of the arms. Both arms 32 are pivotally mounted by means of the pivot pins 34 in slots 36 in the walls 45 on opposed sides of the conical shaped member 23. The rollers are covered with soft rubber and are rotatable in the arms. In a like manner, a rubber covered roller 37 is mounted adjacent the ends of a pair of arms 38 and a roller 39 is mounted on the opposite end of the arms 38. The arms 38 are pivotally mounted by means of pivot pins 40 in a slot 41 in the walls 45. The slots 36 and 41 extend outwardly and downwardly at an angle from a central point. A spring 42 at each side is connected between the pivot pin 40 and an anchor pin 44 mounted on one of the walls of the top, and a spring 43 at each side is connected to pin 34 and mount 46 biasing the rollers together. A valve guide 48 is likewse mounted on each of the walls 45 and extends between the ends of the rollers, providing a guide for the rollers moving up and down on actuating the mechanism. Each set of rollers is biased toward the other by means of the crossed helical springs 42 and 43 at each end, mounted on the pivot pins and on the anchor pins in the wall. The geometry of the valve mechanism is such as to maintain at least two of the adjacent rollers biased against each other at all times. A slide 70 mounted on the movable top 29 and sliding in channels 71 fastened on side wall 11 of the top provides straight-line sliding and smooth action.

A length of plastic tubing 50 is fan-folded into the annular opening between the two circular members 22 and 28 and the top end thereof is pulled over the edge and down in between the rollers. The bottom end may be tied or otherwise sealed to provide a storage space 51 for waste in the bottom portion 12.

The operation of the device is accomplished by pulling up the movable top portion, which includes the top 29, seat 14, circular member 22 and the tubing 50, by means of handles 55, or other convenient means for handling the top. The up movement actuates the valve mechanism and feeds additional portions of the plastic tubing into the valve. In the position illustrated in FIG. 2, with the movable top seated against the top edge of the top 10, the two lower rollers 37 and 31 are biased together by means of the springs, sealing the plastic tubing. The upper rollers 30 and 39 are biased against the outside edge of the cone 23. As the inside portion is pulled upwardly, as shown in FIG. 5, the upper rollers 30 and 39 move along the cone toward the open end 24 to position shown in FIG. 5. After passing the bottom 24 of the cone, the rollers 30 and 39 snap together so as to enclose a portion of the tube between the two upper rollers 30 and 39 and the two lower rollers 31 and 37. Both sets of rollers are tightly biased together by means of the springs, sealing the tubing. Note that on raising the top, the pivot pins of the arms move slightly up the slots so that the valve mechanism moves slightly upwardly, but the top moves more, pulling more tubing out of the annular recess. When the two rollers 30 and 39 come together in the middle, they move into notches 58 on opposed sides of the cone 23. The notches retain the rollers in that position for the remainder of the actuation. As the top is pushed downwardly, the pivot pins move out and downwardly in the slots 36 and 41, spreading the two lower rollers 31 and 37 outwardly, but the upper rollers are held together, maintaining a seal on the tubing. As the lower rollers move outwardly, the plastic tubing is opened to the lower part 51 and the waste in the section between the two pairs of rollers is dropped into the space 51 of the tubing. The upper rollers 30 and 39 move down with the cone 23 and are tightly biased together, holding the plastic tubing therebetween. Further movement of the top downwardly continues to move the two rollers 30 and 39 downwardly and the rollers 31 and 37 move outwardly and upwardly as the pivot pins move down the slots 36 and 41 to the point where the arms holding the rollers go past the center point and the rollers 31 and 37 snap upwardly under the tension of the springs and come to rest against the cone 23. The top is then moved further down to where it again seats on the upper edge of the container 10 and the container is ready to receive waste and again to be "flushed." Each movement of the movable top to the upper position advances a portion of tubing and moves the two extended rollers together above the two lower rollers that are already together, sealing the plastic tubing, and each downward movement moves the lower rollers outwardly and back up around to where they are held by the cone for the next "flushing."

For convenience in loading the plastic tubing into the container, a cardboard cartridge, shown in general by numeral 60, is shown in FIG. 7. The cartridge includes a wall 61 on which the tubing 50 is fan-folded. In another form, an open top cardboard annulus may be used as a container for the tubing. The tubing is accordion-pleated or fan-folded into the space between the inner and outer walls of the open top annulus or on the carboard tube of FIG. 7. The amount of tubing placed in the cartridge is deterimned by the number of "flushes" desired with the disposer. The dimensions of the cartridge are such so that they fit in the annular sapce between the inner and outer walls 22 and 28 of the movable top portion, providing a simple means of loading the plastic container into the portable toilet.

As shown in FIG. 2, the tubing extends from the underside of the seat to and through the valve mechanism and only the inside of the tubing is exposed to waste. There is no chance for waste to come into contact with the parts of the disposer, so it is a very sanitary device. The end of the tubing is easily tied so that disposal of the waste is easy. The upper end may be tied while the tubing is in the valve so that no offensive odors are released in disposing of the waste.

While the invention has been described by reference to a particular embodiment, there is no intent to limit the spirit and scope of the invention to the precise details so set forth except as defined in the following claims.

I claim:

1. A portable waste dispenser comprising frame means arranged with an upper opening to hold a disposable container in position to receive waste; a receiver for a length of disposable plastic tubing mounted adjacent said opening and arranged to permit a portion of the same to hang downwardly; seal-valve means inclusive of means for forming spaced-apart upper and lower temporary seals laterally across said tubing, said seal-valve means mounted in said frame means below said receiver and arranged to stepwise temporarily seal said tubing at said upper and lower seal means progressively one above the other along said tubing, the lowermost seal being retained in tight sealing relation until the upper seal is tightly closed; and said receiver being movable toward and away from said seal-valve means to actuate said seal-valve means and to draw additional tubing from the receiver and close said top seal and to open said bottom seal.

2. A portable waste disposer according to claim 1 wherein said seal-valve means includes two pairs of elongated rubber rollers spring biased together in pairs and arranged so that at least said one pair is together at all times, and said tubing is arranged to be positioned between said rollers and temporarily sealed between said at least one pair.

3. A portable waste disposer according to claim 2 wherein two rollers are mounted on a pair of spaced-apart arms each pivotally mounted centerwise thereof, whereby one roller on each pair of arms is arranged to be biased against a roller on the other pair of arms.

4. A portable waste disposer acoording to claim 3 wherein said receiver includes a downwardly directed tubular member movable with said receiver and positioned to hold a pair of said rollers apart when positioned therebetween.

5. A portable waste disposer according to claim 4 wherein said centerwise pivot of each said arm is mounted in a downwardly and outwardly directed slot permitting limited movement thereof, wherby the lower pair of rollers are moved in sequence from a lower seal position on said tubing in a disposer operable position where the upper pair of rollers are spread apart engaging said tubular member, to an intermediate position where said upper pair of rollers are together sealing a portion of said tubing above the lower pair of rollers, to another operable position where said lower pair of rollers are spread apart engaging said tubular member and said upper pair of rollers are in a lower position sealing said tubing.

6. A portable waste disposer according to claim 5 wherein said tubular member includes notch means engaging the upper pair of rollers whereby downward movement of said receiver and said tubular member moves said upper pair of rollers downwardly maintaining a seal on said tubing and advancing a portion of tubing from said receiver and moves said central pivots on said arms downwardly in said slots spreading said lower pair of rollers apart and outwardly past the center point of pivot of said arms so that said lower rollers move upwardly engaging said tubular member.

7. A portable waste disposer according to claim 1 wherein said receiver includes toilet seat means, and said frame means is arranged to support said seat at a usable height for a user.

8. A portable waste disposer according to claim 1 wherein said frame means includes an upper portion and a lower portion releasably secured together.

9. A portable waste disposer according to claim 8 wherein said upper frame telescopes in said lower frame.

References Cited

UNITED STATES PATENTS

| | | | |
|---|---|---|---|
| 97,135 | 11/1869 | True | 4—144 |
| 2,041,187 | 5/1936 | Jonda | 4—143 |
| 2,067,958 | 1/1937 | Wallace | 4—142 |
| 2,671,906 | 3/1954 | Potts | 4—142 |
| 2,794,989 | 6/1957 | Pellerito et al. | 4—111 |
| 2,801,426 | 8/1957 | Gorce et al. | 4—142 |
| 3,070,931 | 1/1963 | Zwight | 53—187 |
| 3,142,847 | 8/1964 | Kurrels | 4—142 |
| 3,158,874 | 12/1964 | Bennett | 4—142 |
| 3,381,315 | 5/1968 | Glossberg | 4—142 |

LAVERNE D. GEIGER, *Primary Examiner.*

HENRY K. ARTIS, *Assistant Examiner.*

U.S. Cl. X.R.

4—121